US007286506B2

(12) United States Patent
Abrishamkar et al.

(10) Patent No.: US 7,286,506 B2
(45) Date of Patent: Oct. 23, 2007

(54) METHOD AND APPARATUS FOR PILOT ESTIMATION USING A PREDICTION ERROR METHOD WITH A KALMAN FILTER AND A GAUSS-NEWTON ALGORITHM

(75) Inventors: Farrokh Abrishamkar, San Diego, CA (US); Kenneth Kreutz-Delgado, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 948 days.

(21) Appl. No.: 10/262,044

(22) Filed: Sep. 30, 2002

(65) Prior Publication Data

US 2003/0227887 A1 Dec. 11, 2003

Related U.S. Application Data

(60) Provisional application No. 60/386,960, filed on Jun. 5, 2002.

(51) Int. Cl.
*H04Q 7/00* (2006.01)

(52) U.S. Cl. ............... 370/332; 370/310.2; 370/320; 370/328; 370/332; 370/335; 370/342; 370/441; 375/148; 375/130; 375/341

(58) Field of Classification Search ............ None
See application file for complete search history.

(56) References Cited

U.S. PATENT DOCUMENTS

| | | |
|---|---|---|
| 4,901,307 A | 2/1990 | Gilhousen et al. |
| 5,101,501 A | 3/1992 | Gilhousen et al. |
| 5,103,459 A | 4/1992 | Gilhousen et al. |
| 5,764,687 A | 6/1998 | Easton |

(Continued)

FOREIGN PATENT DOCUMENTS

WO 0021208 4/2000

(Continued)

OTHER PUBLICATIONS

Baltersee, J., et al. (2000) Performance analysis of phasor estimation algorithms for a FDD-UMTS RAKE Receiver. IEEE, 6th Int. Symp. Sep. 6-8; pp. 476-480.

Bohn, C., et al. (2001) Sensitivity models for nonlinear filters with application to recursive parameter estimation for nonlinear state-space models. IEEE Proc.-Control Theory Appl., vol. 148(2):137-145.

(Continued)

*Primary Examiner*—Raj K. Jain
(74) *Attorney, Agent, or Firm*—Jonathan T. Velasco; Thomas R. Rouse (57) ABSTRACT

A system is disclosed for use in a wireless communication system to provide an estimated pilot signal. The system includes a receiver and a front-end processing and despreading component in electronic communication with the receiver for despreading a CDMA signal. A pilot estimation component is in electronic communication with the front-end processing and despreading component for estimating an original pilot signal using a Kalman filter to produce a pilot estimate. A demodulation component is in electronic communication with the pilot estimation component and the front-end processing and despreading component for providing demodulated data symbols. The Kalman filter is configured by an offline system identification process that calculates parameters using a prediction error method and a Gauss-Newton algorithm and generates state estimates using the Kalman filter. The calculating and generating are iteratively performed to train the Kalman filter for real-time operation.

42 Claims, 8 Drawing Sheets

U.S. PATENT DOCUMENTS

| | | | |
|---|---|---|---|
| 5,768,307 A * | 6/1998 | Schramm et al. | 375/150 |
| 6,240,099 B1 * | 5/2001 | Lim et al. | 370/441 |
| 6,570,910 B1 * | 5/2003 | Bottomley et al. | 375/148 |
| 2007/0030827 A1 * | 2/2007 | Rui et al. | 370/335 |

FOREIGN PATENT DOCUMENTS

WO    WO 02/096049 A1 *  11/2002

OTHER PUBLICATIONS

Shanmugan, K., et al. (2000) Channel estimation for 3G wideband CDMA systems using the kalman filtering algorithm. IEEE, XP-002254352m pp. 95-97.

Zhou, X., et al. (2000) Kalman filter channel tracking algorithm based on AR model in WCDMA systems. IEEE, Proceedings of ICSP2000, pp. 1759-1762.

\* cited by examiner

METHOD AND APPARATUS FOR PILOT ESTIMATION USING A PREDICTION ERROR METHOD WITH A KALMAN FILTER AND A GAUSS-NEWTON ALGORITHM

RELATED APPLICATIONS

Claim of Priority Under 35 U.S.C. § 119(e)

The present Application for Patent claims priority of U.S. Provisional Application No. 60/386,960, filed Jun. 5, 2002, assigned to the assignee hereof and hereby expressly incorporated by reference herein.

Reference to Co-Pending Applications for Patent

The present invention is related to the following Applications for Patent in the U.S. Patent & Trademark Office:
"Method And Apparatus For Pilot Estimation Using Sub-optimum Expectation Maximization" by Farrokh Abrishamkar et al., having Attorney Docket No. 020123, filed concurrently herewith and assigned to the assignee hereof;
"Method And Apparatus For Pilot Estimation Using A Wiener Filter" by Farrokh Abrishamkar et al., having Attorney Docket No. 020099, filed concurrently herewith and assigned to the assignee hereof;
"Method And Apparatus For Pilot Estimation Using A Prediction Error Method With A Kalman Filter And Pseudo-Linear Regression", by Farrokh Abrishamkar et al., having Attorney Docket No. 020201, filed concurrently herewith and assigned to the assignee hereof; and
"Method And Apparatus For Pilot Estimation Using An Adaptive Prediction Error Method With a Kalman Filter and A Gauss-Newton Algorithm," by Farrokh Abrishamkar et al., having Attorney Docket No. 020232, filed concurrently herewith and assigned to the assignee hereof.

FIELD

The present invention relates to wireless communication systems generally and specifically, to methods and apparatus for estimating a pilot signal in a code division multiple access system.

BACKGROUND

In a wireless radiotelephone communication system, many users communicate over a wireless channel. The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation technique of CDMA has significant advantages over these modulation techniques for multiple access communication systems.

The CDMA technique has many advantages. An exemplary CDMA system is described in U.S. Pat. No. 4,901,307, entitled "Spread Spectrum Multiple Access Communication System Using Satellite Or Terrestrial Repeaters", issued Feb. 13, 1990, assigned to the assignee of the present invention, and incorporated herein by reference. An exemplary CDMA system is further described in U.S. Pat. No. 5,103,459, entitled "System And Method For Generating Signal Waveforms In A CDMA Cellular Telephone System", issued Apr. 7, 1992, assigned to the assignee of the present invention, and incorporated herein by reference.

In each of the above patents, the use of a forward-link (base station to mobile station) pilot signal is disclosed. In a typical CDMA wireless communication system, such as that described in EIA/TIA IS-95, the pilot signal is a "beacon" transmitting a constant data value and spread with the same pseudonoise (PN) sequences used by the traffic bearing signals. The pilot signal is typically covered with the all-zero Walsh sequence. During initial system acquisition, the mobile station searches through PN offsets to locate a base station's pilot signal. Once it has acquired the pilot signal, it can then derive a stable phase and magnitude reference for coherent demodulation, such as that described in U.S. Pat. No. 5,764,687 entitled "Mobile Demodulator Architecture For A Spread Spectrum Multiple Access Communication System," issued Jun. 9, 1998, assigned to the assignee of the present invention, and incorporated herein by reference.

Recently, third-generation (3G) wireless radiotelephone communication systems have been proposed in which a reverse-link (mobile station to base station) pilot channel is used. For example, in the currently proposed cdma2000 standard, the mobile station transmits a Reverse Link Pilot Channel (R-PICH) that the base station uses for initial acquisition, time tracking, rake-receiver coherent reference recovery, and power control measurements.

Pilot signals can be affected by noise, fading and other factors. As a result, a received pilot signal may be degraded and different than the originally transmitted pilot signal. Information contained in the pilot signal may be lost because of noise, fading and other factors.

There is a need, therefore, to process the pilot signal to counter the effects of noise, fading and other signal-degrading factors.

DETAILED DESCRIPTION

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

The following discussion develops the exemplary embodiments of a data-driven pilot estimator by first discussing a spread-spectrum wireless communication system. Then components of an embodiment of a mobile station are shown in relation to providing a pilot estimate. Before the pilot is estimated, a pilot estimation component is trained. Details regarding the offline system identification used to train the pilot estimation component are set forth. Included in the specification relating to the offline system identification are illustrations and mathematical derivations for a maximum likelihood parameter estimation. The iterative process of generating state estimates and calculating new parameters is discussed. Formulas for both offline system identification and real-time pilot estimating are illustrated.

Note that the exemplary embodiment is provided as an exemplar throughout this discussion; however, alternate embodiments may incorporate various aspects without departing from the scope of the present invention.

The exemplary embodiment employs a spread-spectrum wireless communication system. Wireless communication systems are widely deployed to provide various types of communication such as voice, data, and so on. These systems may be based on CDMA, TDMA, or some other modulation techniques. A CDMA system provides certain advantages over other types of systems, including increased system capacity.

A system may be designed to support one or more standards such as the "TIA/EIA/IS-95-B Mobile Station-Base Station Compatibility Standard for Dual-Mode Wideband Spread Spectrum Cellular System" referred to herein as the IS-95 standard, the standard offered by a consortium named "3rd Generation Partnership Project" referred to herein as 3GPP, and embodied in a set of documents including Document Nos. 3G TS 25.211, 3G TS 25.212, 3G TS 25.213, and 3G TS 25.214, 3G TS 25.302, referred to herein as the W-CDMA standard, the standard offered by a consortium named "3rd Generation Partnership Project 2" referred to herein as 3GPP2, and TR-45.5 referred to herein as the cdma2000 standard, formerly called IS-2000 MC. The standards cited hereinabove are hereby expressly incorporated herein by reference.

Each standard specifically defines the processing of data for transmission from base station to mobile, and vice versa. As an exemplary embodiment the following discussion considers a spread-spectrum communication system consistent with the CDMA2000 standard of protocols. Alternate embodiments may incorporate another standard.

Figure 1:
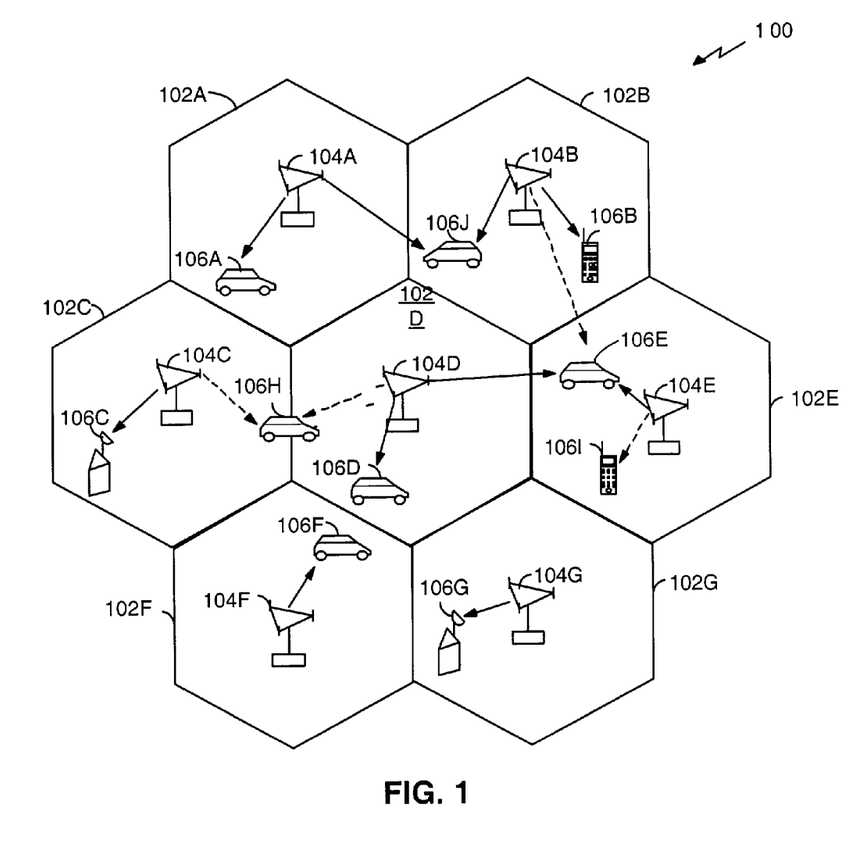
FIG. 1 is a diagram of a spread spectrum communication system that supports a number of users.

FIG. 1 serves as an example of a communications system 100 that supports a number of users and is capable of implementing at least some aspects of the embodiments discussed herein. Any of a variety of algorithms and methods may be used to schedule transmissions in system 100. System 100 provides communication for a number of cells 102A-102G, each of which is serviced by a corresponding base station 104A-104G, respectively. In the exemplary embodiment, some of the base stations 104 have multiple receive antennas and others have only one receive antenna. Similarly, some of the base stations 104 have multiple transmit antennas, and others have single transmit antennas. There are no restrictions on the combinations of transmit antennas and receive antennas. Therefore, it is possible for a base station 104 to have multiple transmit antennas and a single receive antenna, or to have multiple receive antennas and a single transmit antenna, or to have both single or multiple transmit and receive antennas.

Terminals 106 in the coverage area may be fixed (i.e., stationary) or mobile. As shown in FIG. 1, various terminals 106 are dispersed throughout the system. Each terminal 106 communicates with at least one and possibly more base stations 104 on the downlink and uplink at any given moment depending on, for example, whether soft handoff is employed or whether the terminal is designed and operated to (concurrently or sequentially) receive multiple transmissions from multiple base stations. Soft handoff in CDMA communications systems is well known in the art and is described in detail in U.S. Pat. No. 5,101,501, entitled "Method and System for Providing a Soft Handoff in a CDMA Cellular Telephone System", which is assigned to the assignee of the present invention.

The downlink refers to transmission from the base station 104 to the terminal 106, and the uplink refers to transmission from the terminal 106 to the base station 104. In the exemplary embodiment, some of terminals 106 have multiple receive antennas and others have only one receive antenna. In FIG. 1, base station 104A transmits data to terminals 106A and 106J on the downlink, base station 104B transmits data to terminals 106B and 106J, base station 104C transmits data to terminal 106C, and so on.

Figure 2:
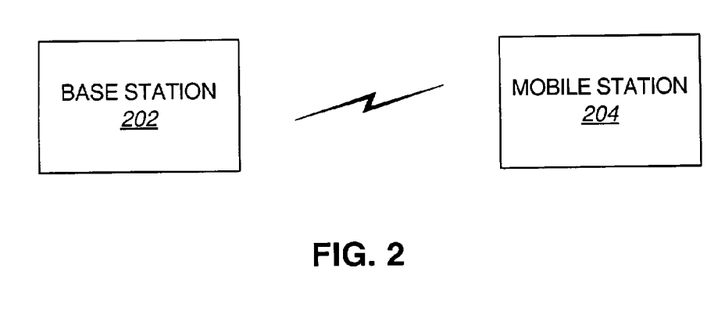
FIG. 2 is a block diagram of a base station and a mobile station in a communications system.

FIG. 2 is a block diagram of the base station 202 and mobile station 204 in a communications system. A base station 202 is in wireless communications with the mobile station 204. As mentioned above, the base station 202 transmits signals to mobile stations 204 that receive the signals. In addition, mobile stations 204 may also transmit signals to the base station 202.

Figure 3:
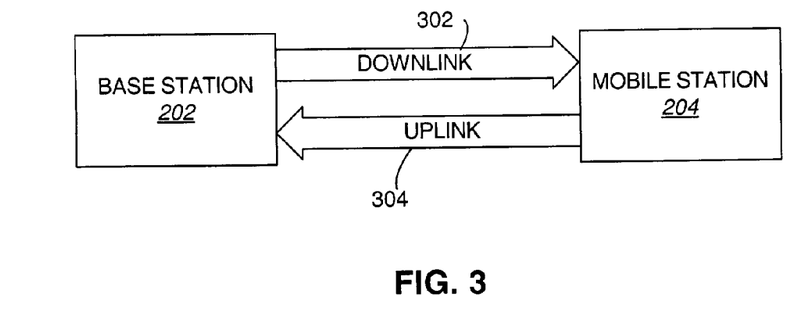
FIG. 3 is a block diagram illustrating the downlink and the uplink between the base station and the mobile station.

FIG. 3 is a block diagram of the base station 202 and mobile station 204 illustrating the downlink 302 and the uplink 304. The downlink 302 refers to transmissions from the base station 202 to the mobile station 204, and the uplink 304 refers to transmissions from the mobile station 204 to the base station 202.

Figure 4:
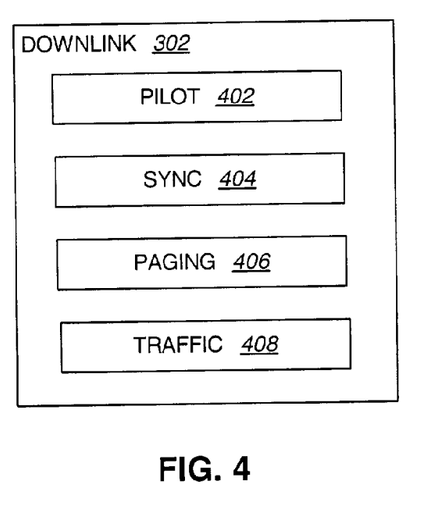
FIG. 4 is a block diagram of the channels in an embodiment of the downlink.

FIG. 4 is a block diagram of the channels in an embodiment of the downlink 302. The downlink 302 includes the pilot channel 402, the sync channel 404, the paging channel 406 and the traffic channel 408. The downlink 302 illustrated is only one possible embodiment of a downlink and it will be appreciated that other channels may be added or removed from the downlink 302.

Although not illustrated, the uplink 304 may also include a pilot channel. Recall that third-generation (3G) wireless radiotelephone communication systems have been proposed in which an uplink 304 pilot channel is used. For example, in the currently proposed cdma2000 standard, the mobile station transmits a Reverse Link Pilot Channel (R-PICH) that the base station uses for initial acquisition, time tracking, rake-receiver coherent reference recovery, and power control measurements. Thus, systems and methods herein may be used to estimate a pilot signal whether on the downlink 302 or on the uplink 304.

Under one CDMA standard, described in the Telecommunications Industry Association's TIA/EIA/IS-95-A Mobile Stations-Base Station Compatibility Standard for Dual-Mode Wideband Spread Spectrum Cellular System, each base station 202 transmits pilot 402, sync 404, paging 406 and forward traffic 408 channels to its users. The pilot channel 402 is an unmodulated, direct-sequence spread spectrum signal transmitted continuously by each base station 202. The pilot channel 402 allows each user to acquire the timing of the channels transmitted by the base station 202, and provides a phase reference for coherent demodulation. The pilot channel 402 also provides a means for signal strength comparisons between base stations 202 to determine when to hand off between base stations 202 (such as when moving between cells).

Figure 5:
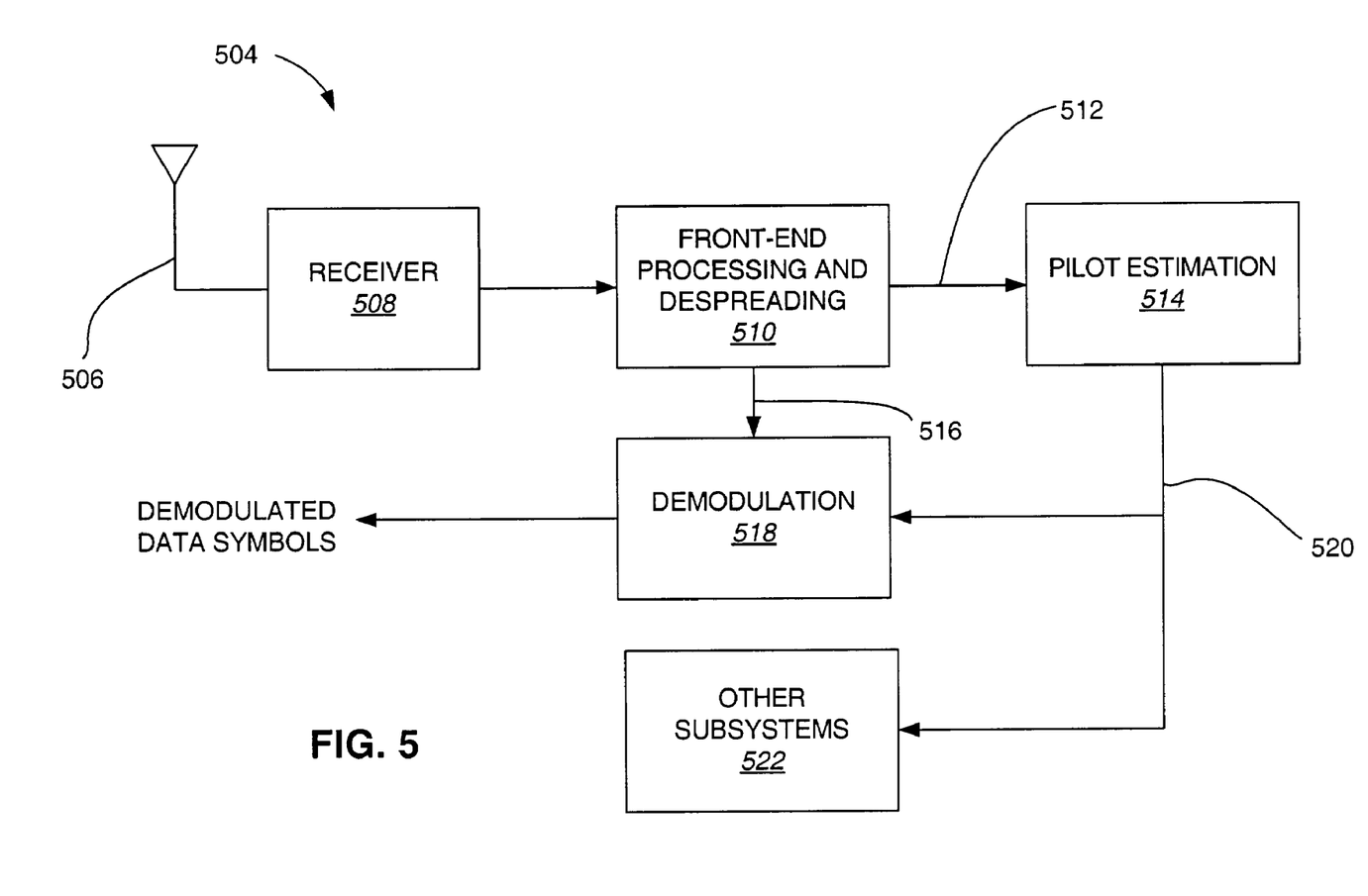
FIG. 5 illustrates a block diagram of certain components in an embodiment of a mobile station.

FIG. 5 illustrates a block diagram of certain components in an embodiment of a mobile station 504. Other components that are typically included in the mobile station 504 may not be illustrated for the purpose of focusing on the novel features of the embodiments herein. Many embodiments of mobile stations 504 are commercially available and, as a result, those skilled in the art will appreciate the components that are not shown.

If the pilot channel 402 were being sent on the uplink 304, the components illustrated may be used in a base station 202 to estimate the pilot channel. It is to be understood that the inventive principles herein may be used with a variety of components to estimate a pilot whether the pilot is being received by a mobile station 504, a base station 202, or any other component in a wireless communications system. Thus, the embodiment of a mobile station 504 is an exemplary embodiment of the systems and methods but it is understood that the systems and methods may be used in a variety of other contexts.

Referring again to FIG. 5, a spread spectrum signal is received at an antenna 506. The spread spectrum signal is provided by the antenna 506 to a receiver 508. The receiver 508 down-converts the signal and provides it to the front-end processing and despreading component 510. The front-end processing and despreading component 510 provides the received pilot signal 512 to the pilot estimation component 514. The received pilot signal 512 typically includes noise and usually suffers from fading.

The front-end processing and despreading component 510 also provides the traffic channel 516 to a demodulation component 518 that demodulates the data symbols.

The pilot estimation component 514 provides an estimated pilot signal 520 to the demodulation component 518. The pilot estimation component 514 may also provide the estimated pilot signal 520 to other subsystems 522.

It will be appreciated by those skilled in the art that additional processing takes place at the mobile station 504. The embodiment of the pilot estimation component 514 will be more fully discussed below. Generally, the pilot estimation component 514 operates to estimate the pilot signal and effectively clean-up the pilot signal by reducing the noise and estimating the original pilot signal that was transmitted.

Systems and methods disclosed herein use a Kalman filter to estimate the pilot signal. Kalman filters are known by those skilled in the art. In short, a Kalman filter is an optimal recursive data processing algorithm. A Kalman filter takes as inputs data relevant to the system and estimates the current value(s) of variables of interest. A number of resources are currently available that explain in detail the use of Kalman filters. A few of these resources are "Fundamentals of Kalman Filtering: A Practical Approach" by Paul Zarchan and Howard Musoff, "Kalman Filtering and Neural Networks" by Simon Haykin and "Estimation and Tracking: Principles, Techniques And Software" by Yaakov Bar-Shalom and X. Rong Li, all of which are incorporated herein by reference.

Figure 6:
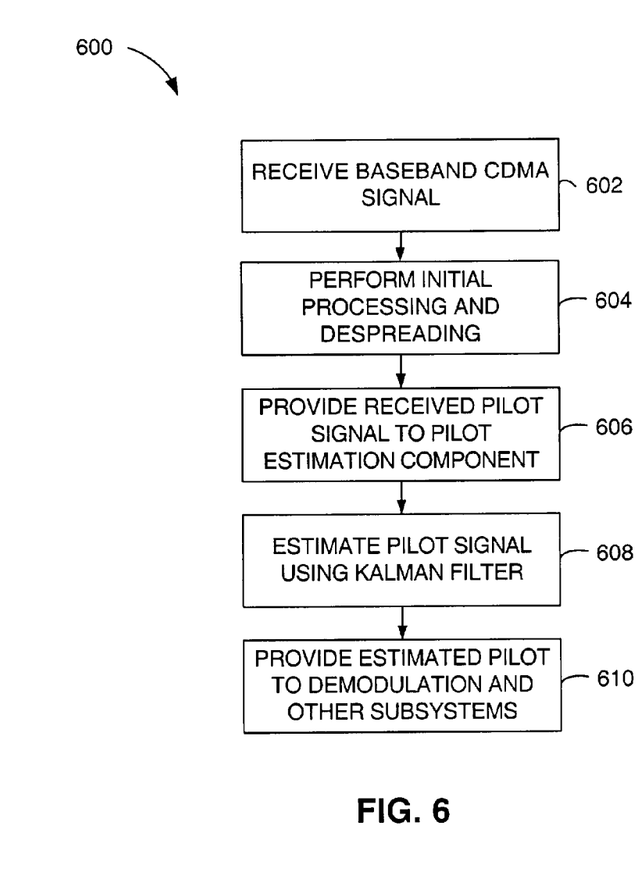
FIG. 6 is a flow diagram of one embodiment of a method for estimating the pilot using a Kalman filter.

FIG. 6 is a flow diagram 600 of one embodiment of a method for estimating the pilot using a Kalman filter. The system receives 602 the baseband CDMA signal. Then the front-end processing and despreading component 510 performs initial processing and despreading 604. The received pilot signal is then provided 606 to the pilot estimation component 514. The received pilot signal has been degraded by various effects, including noise and fading. The pilot estimation component 514 estimates 608 the pilot channel using a Kalman filter. After the pilot has been estimated 608, it is provided 610 to the demodulation component 518 as well as other subsystems 522.

Figure 7:
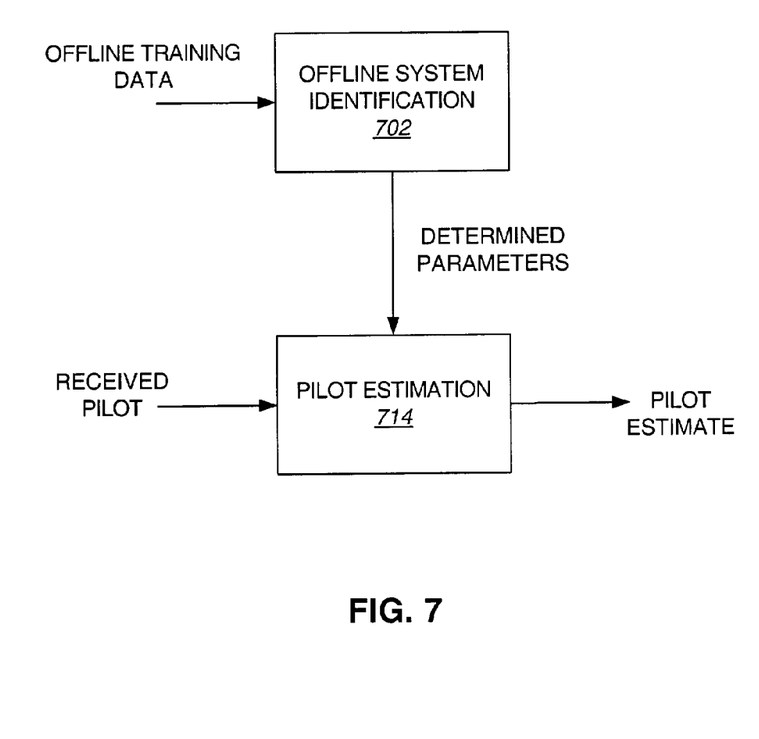
FIG. 7 is a block diagram illustrating the use of an offline system identification component to determine the parameters needed by the Kalman filter.

Referring now to FIG. 7, before the Kalman filter in the pilot estimation component 514 is used, the parameters of the Kalman filter are determined during a training period. As shown, an offline system identification component 702 is used to determine the parameters needed by the Kalman filter. Offline training data is input to the offline system identification component 702 in order to determine the needed parameters. Once the parameters have converged, they are provided to the pilot estimation component 714 and its Kalman filter, to process the received pilot and estimate the original pilot in real time. In the embodiment disclosed herein, the offline system identification component 702 is used once to set up the parameters. After the parameters have been determined, the system uses the pilot estimation component 714 and no longer needs the offline system identification component 702.

Typically the offline system identification 702 is used before a component is being used by the end user. For example, if the system and methods were being used in a mobile station 204, when an end user was using the mobile station 204, it 204 would be using the pilot estimation component 714 to process the pilot in real-time. The offline system identification component 702 is used before the mobile station 204 is operating in real-time to determine the parameters needed to estimate the pilot.

The following discussion provides details regarding the calculations that will be made in the offline system identification component 702 as well as the pilot estimation component 714. Additional details and derivations known by those skilled in the art are not included herein.

The received pilot complex envelope after despreading is given by the following formula:

$$\tilde{y}_k = \tilde{s}_k + \tilde{v}_k \quad \text{Formula 1.}$$

The received complex envelope in Formula 1 is represented as $\tilde{y}_k$. The original but faded pilot signal is represented as $\tilde{s}_k$. The noise component is represented as $\tilde{v}_k$. For a single path mobile communication channel, the original pilot signal may be represented by the mathematical model found in Formula 2. The corresponding noise component may be represented by the formula found in Formula 3.

$$\tilde{s}_k = \rho_k e^{j\phi_k} R_{hh}(\tau) = g_k N\sqrt{E_c P} R_{hh}(\tau) f_k \quad \text{Formula 2.}$$

$$\tilde{v}_k = g_k \sqrt{NI_{oc}}\, \tilde{n}_k + g_k \sqrt{NI_{or}} \sum_{m=-\infty, m\neq k}^{+\infty} R_{hh}(mT_c - \tau)\tilde{w}_k \quad \text{Formula 3.}$$

The variables and parameters in the formulas found in Formulas 2 and 3 are given in Table 1.

TABLE 1

| | |
|---|---|
| $\sqrt{E_P}$: | Pilot Envelope |
| $I_{oc}$: | Total AWGN Noise |

TABLE 1-continued

| | |
|---|---|
| $I_{or}$: | Total Transmit PSD |
| $g_k$: | AGC Control Signal |
| $\rho_k$: | Rice (Rayleigh) Fade Process |
| $f_k$: | Complex Gaussian Fade Process with Clark Spectrum |
| $\phi_k$: | Fading Phase |
| m, k: | Chip and Symbol Counts |
| N: | Processing Gain |
| $R_{hh}(\tau)$: | Correlation |
| $\tau$: | Time Offset |
| $\tilde{n}k, \tilde{w}k$: | Zero Mean Unit Power Gaussian Noise |

The demodulation component 518 requires the phase of the pilot signal. In order to obtain the phase, the signals may be written in a form comprising I and Q components rather than being written in an envelope form. In Formula 4, $\tilde{y}$ represents the received pilot comprising its I and Q components. The faded pilot, without any noise, is represented as $\tilde{s}$ in Formula 5. The total noise is represented in Formula 6 as $\tilde{v}$. Formula 7 illustrates the fade as $\tilde{f}$.

$$\tilde{y} = y_I + jy_Q \quad \text{Formula 4.}$$

$$\tilde{s} = s_I + js_Q \quad \text{Formula 5.}$$

$$\tilde{v} = v_I + jv_Q \quad \text{Formula 6.}$$

$$\tilde{f} = \rho e^{j\phi} = f_I + jf_Q \quad \text{Formula 7.}$$

Given the relationships of the formulas above, the I and Q components of the faded pilot symbol without noise may be written as shown in Formulas 8 and 9.

$$s_I(k) = f_I(k) N \sqrt{E_c^p} R_{hh}(\tau) g(k) \quad \text{Formula 8.}$$

$$s_Q(k) = f_Q(k) N \sqrt{E_c^p} R_{hh}(\tau) g(k) \quad \text{Formula 9.}$$

Those skilled in the art will appreciate that the Wold decomposition theorem may be used to model a time series. According to Wold decomposition, a time series can be decomposed into predictable and unpredictable components. The unpredictable component of the time series (under well-known spectral decomposition conditions) can be expanded in terms of its innovations. The Wold expansion of observations $y_k$ may be approximated by a finite-dimensional ARMA Model as shown in Formula 10. The approximate innovations are represented by $e_k$ and it is assumed that $E(e_k | Y_{k-1}) = 0$. The optimal estimator may be propagated on Formula 10 resulting in three alternative forms as shown in Formulas 11, 13 and 16. The approximate innovations, represented by $e_k$, is also the prediction error, as shown in Formula 12. The equalities found in Formulas 14 and 15 are assumed for Formula 13. Formulas 11, 13 and 16 are three alternative forms for the one-step predictor.

$$-y_k - a_1 y_{k-1} - \ldots - a_n y_{k-n} = e_k - d_1 e_{k-1} - \ldots - d_m e_{k-m} \quad \text{Formula 10.}$$

$$-\hat{y}_{k|k-1} = E(y_k | Y_{k-1}) = a_1 y_{k-1} + \ldots + a_n y_{k-n} - d_1 e_{k-1} - \ldots - d_m e_{k-m} \quad \text{Formula 11.}$$

$$e_k = y_k - \hat{y}_{k|k-1} \quad \text{Formula 12.}$$

$$-\hat{y}_k = a_1 \hat{y}_{k-1} + \ldots + a_n \hat{y}_{k-n} + L_1 e_{k-1} + \ldots + L_m e_{k-m} \quad \text{Formula 13.}$$

$$\hat{y}_k = \hat{y}_{k|k-1} \quad \text{Formula 14.}$$

$$L_i = a_i - d_i \quad \text{Formula 15.}$$

$$-\hat{y}_k = d_1 \hat{y}_{k-1} + \ldots + d_n \hat{y}_{k-n} + L_1 y_{k-1} + \ldots + L_m y_{k-m} \quad \text{Formula 16.}$$

The alternative forms shown in Formulas 11, 13 and 16 are ARMA equivalents of a one-step Kalman Filter which may be seen in the first order case where m=n=1, a=d and $L = L_i$ yielding the equalities as shown in Formula 17. Since $\hat{x}_k = \hat{y}_k$ indicates a first order Kalman filter state, a Kalman filter is provided as shown in Formula 18.

$$\hat{y}_{k+1} = a\hat{y}_k + Le_k = (a-L)\hat{y}_k + Ly_k = d\hat{y}_k + Ly_k \quad \text{Formula 17.}$$

$$\hat{x}_{k+1} = d\hat{x}_k + Ly_k \quad \text{Formula 18.}$$

In this embodiment, a prediction error method is used. Prediction error method involves finding optimum model parameters $a_l$, $d_l$ and $L_l$ by minimizing a function of the one-step prediction error, shown in Formula 19, with g being some cost function. Using this approach avoids the need of having an error based on the actual pilot signal.

A quadratic loss function may be used as shown by Formula 20. Applying the quadratic loss function as shown in Formula 20 to Formula 16 yields Formula 21. Formula 22 is a representation of a first order model.

$$g(e_k) = g(y_k - \hat{y}_{k|k-1}(\theta)) \quad \text{Formula 19.}$$

$$g(e_k) = e_k^2 = (y_k - \hat{y}_k)^2 \quad \text{Formula 20.}$$

$$-\hat{y}_k = [\hat{y}_{k-1}, \ldots, \hat{y}_{k-n}, y_{k-1}, \ldots, y_{k-m}][d_1, \ldots, d_n, L_1, \ldots, L_m]^T \triangleq \phi_{k-1}(\theta)\theta \quad \text{Formula 21.}$$

$$-\hat{y}_k = [\hat{y}_{k-1} y_{k-1}][dL]^T \triangleq \phi_{k-1}(\theta)\theta \quad \text{Formula 22.}$$

The function $\phi_{k-1}$ in Formula 21 is a model-dependent function of $\theta$ resulting from $\hat{y}_k = \hat{y}_k(\theta)$. It may be noted that $g(e_k(\theta)) = (y_k - \phi_{k-1}(\theta)\theta)^2$ is a non-quadratic in $\theta$ due to the function $\phi_{k-1}(\theta)$. As a result a closed-form solution does not exist.

In an embodiment disclosed herein, a Gauss-Newton method is used to solve the problem of finding a numerical solution to the cost function. Minimizing $g(e_k) = e_k^2$ is equivalent to maximizing the log likelihood function under the Gaussian assumption.

In this embodiment, the cost function is solved numerically using the Gauss-Newton method (a generalized steepest-descent algorithm). The optimization to be solved is shown in Formulas 23 and 24. The function $\hat{y}(\theta)$ is equal to that shown in Formula 25. The total prediction error method cost function over the length of the pilot samples is shown in Formula 26.

$$-\underset{\theta}{\text{Min}}\{\Lambda(\theta)\} = \underset{\theta}{\text{Min}}\left\{\frac{1}{N}\sum_{k=1}^{N}(y_k - \phi_{k-1}(\theta)\theta)^2\right\} \quad \text{Formula 23.}$$

$$\underset{\theta}{\text{Min}}\left\{\frac{1}{N}\sum_{k=1}^{N}(y_k - \phi_{k-1}(\theta)\theta)^2\right\} = \underset{\theta}{\text{Min}}\left\{\frac{1}{N}\sum_{k=1}^{N}(y_k - \hat{y}_k(\theta))^2\right\} \quad \text{Formula 24.}$$

$$\hat{y}(\theta) = \hat{y}_{k|k-1}(\theta) = \phi_{k-1}(\theta)\theta \quad \text{Formula 25.}$$

$$\Lambda(\theta) = \frac{1}{N}\sum_{k=1}^{N}(y_k - \phi_{k-1}(\theta)\theta)^2 = \frac{1}{N}\sum_{k=1}^{N}e_k^2(\theta) \quad \text{Formula 26.}$$

The following formulas illustrate the gradient derivation. Formula 27 details $\nabla_\theta \Lambda(\hat{\theta})$. $\psi$ is a row vector and is shown in Formula 28.

$$\nabla_\theta \Lambda(\hat{\theta}) = \left(\frac{\partial}{\partial \theta} \Lambda(\theta)\right)^T_{\theta=\hat{\theta}}$$

$$= -\frac{2}{k} \sum_{k=1}^{N} \nabla_\theta \hat{y}_k(\hat{\theta}) e_k(\hat{\theta})$$

$$= -\frac{2}{k} \sum_{k=1}^{N} \nabla_\theta \hat{y}_k(\hat{\theta})(y_k - \hat{y}_k(\hat{\theta}))$$

$$= -\frac{2}{N} \sum_{k=1}^{N} \psi^T_{k-1}(\hat{\theta}) e_k(\hat{\theta})$$

$$= -\frac{2}{N} \sum_{k=1}^{N} \psi^T_{k-1}(\hat{\theta})(y_k - \hat{y}_k(\hat{\theta})).$$

Formula 27.

$$\psi_{k-1}(\theta) = -\frac{\partial}{\partial \theta} e_k(\theta) = \frac{\partial}{\partial \theta} \hat{y}_k(\theta) = \frac{\partial}{\partial \theta}(\phi_{k-1}(\theta)\theta)$$

Formula 28.

The required derivative of $\hat{y}_k(\theta) = \phi_{k-1}(\theta)\theta$ with respect to $\theta$ is given by Formulas 29 and 30.

$$\psi_{k-1}(\theta) \triangleq \frac{\partial}{\partial \theta} \hat{y}_{k|k-1}(\theta) = \left(\frac{\partial}{\partial \theta_1} \hat{y}_{k|k-1}(\theta), \ldots, \frac{\partial}{\partial \theta_N} \hat{y}_{k|k-1}(\theta)\right)$$

Formula 29.

$$\psi_{k-1}(\theta) = \frac{\partial}{\partial \theta}[\phi_{k-1}(\theta)\theta] = \theta^T\left(\frac{\partial}{\partial \theta} \phi^T_{k-1}(\theta)\right) + \phi_{k-1}(\theta)$$

Formula 30.

In the first-order case, Formula 30 becomes the expression shown in Formula 31 where $d=d_1$. $\psi_{k-2}(\theta)$ and $\phi_{k-1}(\theta)$ are row vectors. It may also be noted that $\nabla_\theta$ is a column vector, $$\frac{\partial}{\partial \theta}$$

is a row vector, and that $$\nabla_\theta = \left(\frac{\partial}{\partial \theta}\right)^T. \quad \psi_{k-1}(\theta) = d\psi_{k-2}(\theta) + \psi_{k-1}(\theta)$$

Formula 31.

A generalized gradient descent algorithm has the form shown in Formula 32. The term $\Delta\hat{\theta}$ is equal to the expression as shown in Formula 33.

$$\hat{\theta} \leftarrow \hat{\theta} - \alpha Q \nabla_\theta \Lambda(\hat{\theta}) = \hat{\theta} + 2\alpha Q \frac{1}{N} \sum_{k=1}^{N} \psi^T_{k-1}(\hat{\theta}) e_k(\hat{\theta}) = \hat{\theta} + \alpha\Delta\hat{\theta}$$

Formula 32.

$$\Delta\hat{\theta} = 2Q\frac{1}{N}\sum_{k=1}^{N} \psi^T_{k-1} e_k$$

Formula 33.

In Formula 32, $\nabla_\theta \Lambda(\hat{\theta})$ is the gradient of the prediction error method cost function $\Lambda(\theta)$ evaluated at the current estimate $\hat{\theta}$. The parameter $\alpha$ is the adjustable step size. The term Q is a symmetric positive definite matrix. Depending upon the value of Q, the result may be a standard gradient descent (LMS-like) method or it may be a Newton method. When Q=I, the result is the standard gradient descent (LMS-like) method. When $$Q = \left(\frac{\partial^2 \Lambda(\hat{\theta})}{\partial \theta^2}\right)^{-1} = (\text{Hessian})^{-1},$$

the result is the Newton method.

The Gauss-Newton method is obtained by approximating the Hessian as shown in Formula 34. In this case, Q is equal to that described by Formula 35. The derivation of the approximation of the Hessian in Formula 34 is shown in Formulas 36-39. The Gaussian-Newton approximation is shown in Formula 39. The second term in Formula 38

$$\left(-\frac{2}{N}\sum_{k=1}^{N} e_k(\hat{\theta})\frac{\partial}{\partial \theta}\psi^T_{k-1}(\hat{\theta})\right)$$

is dropped to arrive at the approximation in Formula 39.

$$\frac{\partial^2 \Lambda(\hat{\theta})}{\partial \theta^2} \approx \frac{2}{N}\sum_{k=1}^{N} \psi^T_{k-1}(\hat{\theta})\psi_{k-1}(\hat{\theta})$$

Formula 34.

$$Q = Q(\hat{\theta}) = \left(\frac{2}{N}\sum_{k=1}^{N} \psi^T_{k-1}(\hat{\theta})\psi_{k-1}(\hat{\theta})\right)^{-1}$$

Formula 35.

$$H(\hat{\theta}) = \frac{\partial^2}{\partial \theta^2}\Lambda(\hat{\theta}) = \frac{\partial}{\partial \theta}\Delta_\theta \Lambda(\hat{\theta}) \approx$$

Formula 36.

$$\frac{2}{N}\sum_{k=1}^{N} \psi^T_{k-1}(\hat{\theta})\psi_{k-1}(\hat{\theta}) -$$

Formula 37.

$$\frac{2}{N}\sum_{k=1}^{N}\left(y_k - \hat{y}_k(\hat{\theta})\psi^T_{k-1}(\hat{\theta})\frac{\partial}{\partial \theta}\psi^T_{k-1}(\hat{\theta})\right) =$$

$$\frac{2}{N}\sum_{k=1}^{N} \psi^T_{k-1}(\hat{\theta})\psi_{k-1}(\hat{\theta}) - \frac{2}{N}\sum_{k=1}^{N} e_k(\hat{\theta})\frac{\partial}{\partial \theta}\psi^T_{k-1}(\hat{\theta}) \approx$$

Formula 38.

$$\frac{2}{N}\sum_{k=1}^{N} \psi^T_{k-1}(\hat{\theta})\psi_{k-1}(\hat{\theta})$$

Formula 39.

To train the Kalman filter for real-time operation, this embodiment uses a first-order ARMA for $\hat{y}_k$ and prediction $e_k = y_k - \hat{y}_k = y_k - \hat{x}_k$. The one-step predictor (Kalman Filter) is obtained as shown in Formulas 40-42.

We obtain the 1-step predictor (Kalman Filter) where $(\hat{L}=\hat{a}-\hat{d})$ and for $k=1, \ldots, N$.

$$\hat{x}_{k+1|k} = \hat{d}\hat{x}_{k+1|k} + \hat{L}y_k$$

Formula 40.

$$\phi_{k-1} = [\hat{x}_{k-1}, y_{k-1}]$$

Formula 41.

$$\psi_k = \hat{d}\psi_{k-1} + \phi_{k-1}$$

Formula 42.

The cost function may be minimized according to Formulas 43-44.

$$\Delta\hat{\theta} = [\Delta\hat{d}, \Delta\hat{L}]^T = \left(\frac{1}{N}\sum_{k=1}^{N} \psi^T_{k-1}\psi_{k-1}\right)^{-1}\left(\frac{1}{N}\sum_{k=1}^{N} \psi^T_{k-1} e_k\right)$$

Formula 43.

$$\hat{\theta} \leftarrow \hat{\theta} + \alpha\Delta\hat{\theta}$$

Formula 44.

The pilot estimation component 714 operates to take as input the received pilot signal which is noisy and faded to produce an estimate of the pilot signal. A Kalman filter may be used in real-time to estimate the pilot. In the training state, the Kalman filter is trained on training data. A parameter estimation component estimates parameters, discussed below, and provides the parameters to the Kalman filter. The Kalman filter uses the parameters and provides a state estimate to the parameter estimation component. The process shown is iterated through until the parameters for the Kalman filter have converged. This process will be more fully discussed in relation to FIGS. 8-10.

Figure 8:
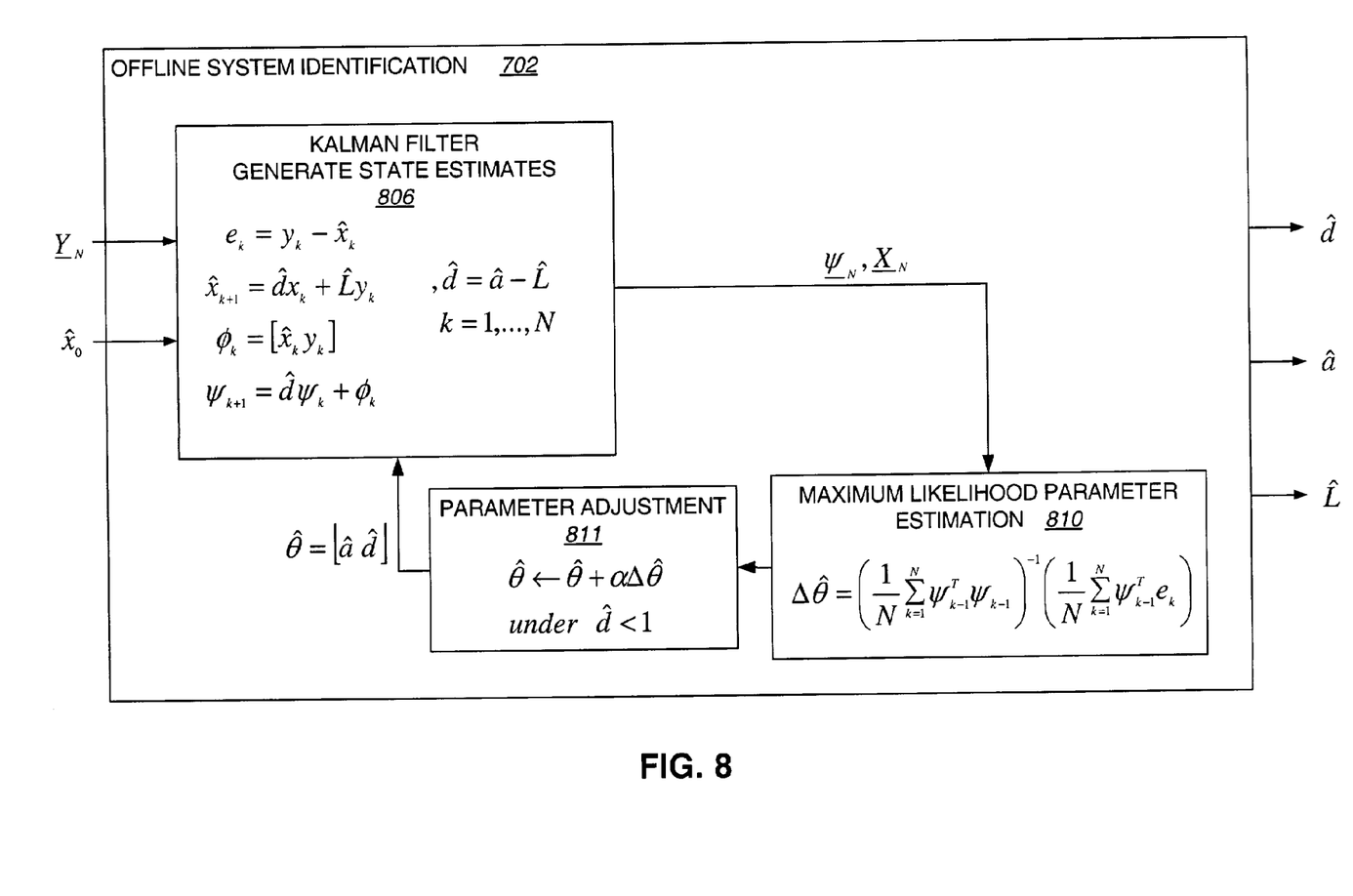
FIG. 8 is a block diagram illustrating the offline system identification operation.

FIG. 8 is a block diagram illustrating the offline system identification operation 702. Initialized parameters are provided to the Kalman filter 806 to generate state estimates. In addition, training data $(Y_1, Y_2, \ldots Y_N)$ is also provided to the Kalman filter 806. With the initialized parameters and training data, the Kalman filter 806 generates a state estimate $\hat{X}_N = \{\hat{x}_0, \ldots, \hat{x}_N\}$ according to the formulas as described above. The new state estimate is provided to the maximum likelihood parameter estimation component 810.

The maximum likelihood parameter estimation component 810 calculates new parameter values using the equations in Formulas 43 and 44. A state space model is formed, and the Kalman filter 806 generates new sequence state estimate. A parameter adjustment component 811 may adjust the parameter $\hat{\theta}$ according to the formula shown in the parameter adjustment component 811 of FIG. 8 if d<1. The Kalman filter 806 and the maximum likelihood parameter estimation component 810 continue to operate until the parameters have converged.

In the embodiment of FIG. 8, the training runs for the length of the pilot symbol record. In addition, the sequence of pilot symbols may be tuned to the target speed and environment of choice.

Figure 9:
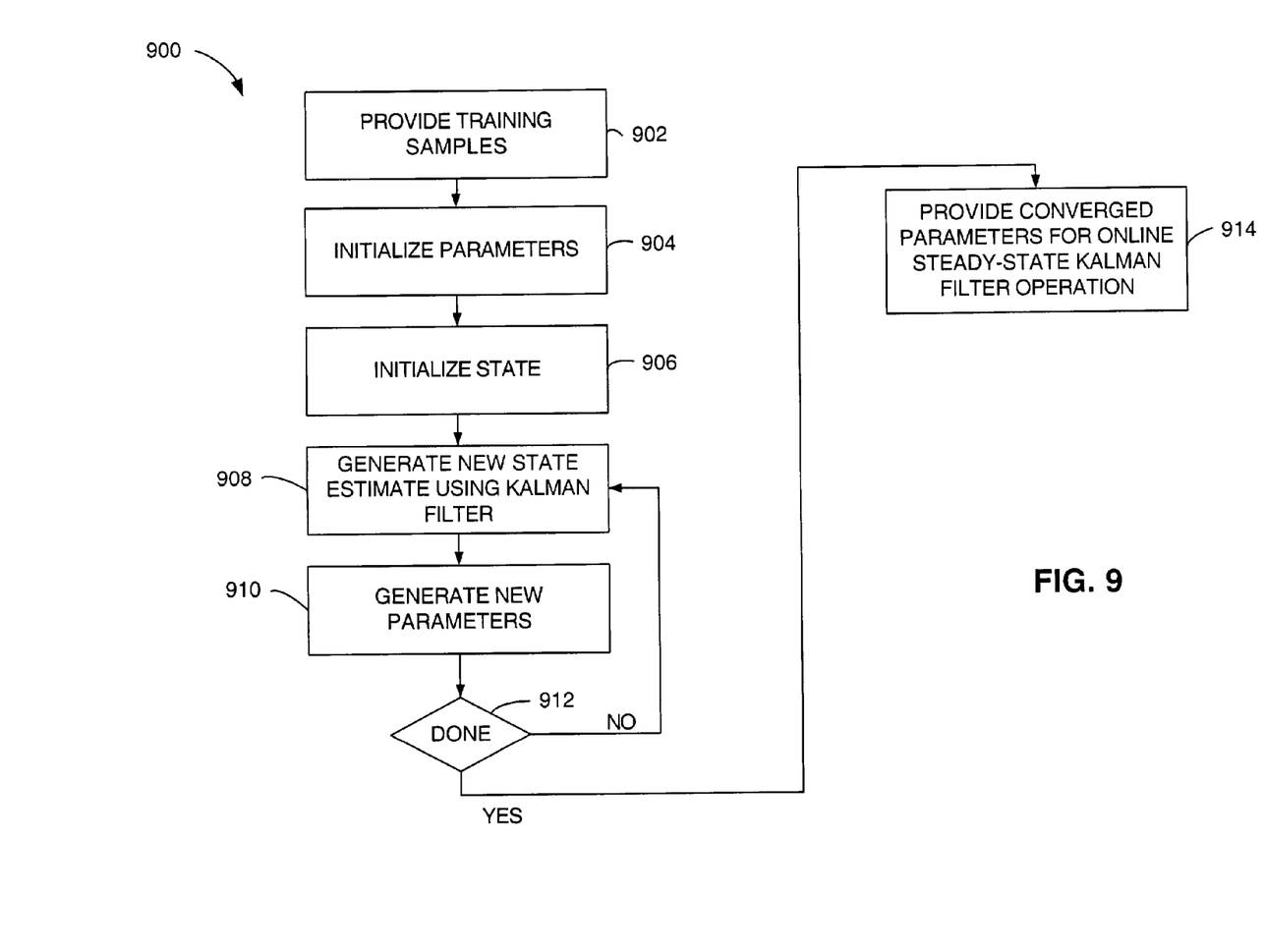
FIG. 9 is a flow diagram of a method for configuring a Kalman filter for steady state operation to estimate the pilot.

FIG. 9 is a flow diagram of a method for configuring a Kalman filter 806 for steady state operation to estimate the pilot. Training samples are provided 902 to the offline system identification component 702. The parameters are initialized 904. In addition, the state is initialized 906. Then the Kalman filter 806 is used to generate 908 a new state estimate. The maximum likelihood parameter estimation 810 is used to generate 910 new parameters. The generating steps 908, 910 are repeated 912 until the filter and parameters have converged. Those skilled in the art will appreciate the various ways in which one may determine that the filter and parameters have converged. After the system has completed training the filter 806, the converged parameters are provided 914 for online steady-state (real-time) Kalman filter operation.

Figure 10:
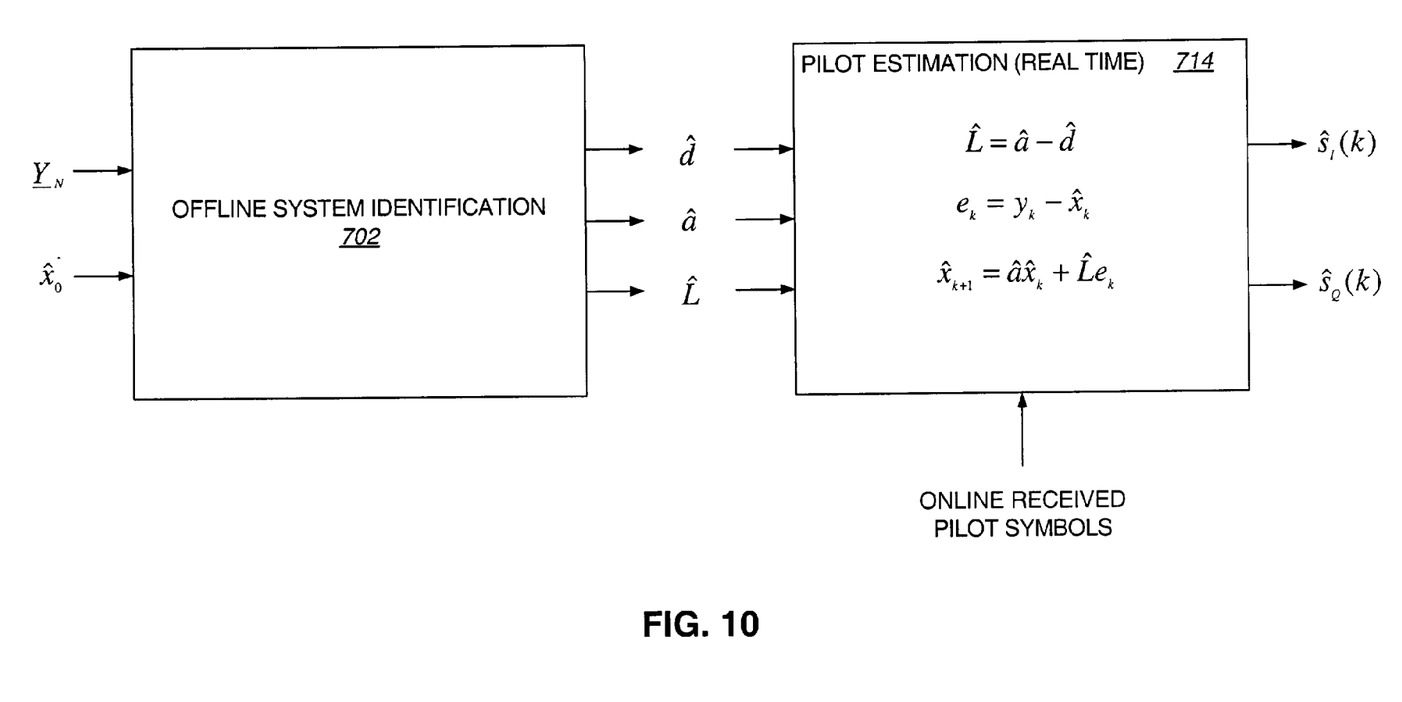
FIG. 10 is a block diagram illustrating the inputs to and outputs from the offline system identification component and pilot estimation component.

FIG. 10 is a block diagram illustrating the inputs to and outputs from the offline system identification component 702 and pilot estimation component 714. The offline system identification component 702 is provided training samples $\underline{Y}_N$ and initial condition $\hat{x}_0$. The system identification component 702 operates in an iterative fashion, as described above, until the necessary parameters have converged. After the system identification component 702 has completed training, it 702 provides the state, parameters and initial conditions to the pilot estimation component 714. The pilot estimation component 714 comprises the Kalman filter 806 operating in real-time. Thus, at this stage the Kalman filter 806 is no longer training, but is being used to estimate the pilot, given the received pilot as input.

As discussed above, the pilot estimation component 714 uses a Kalman filter to estimate the pilot. The calculations for the Kalman filter 806 operating in real-time are shown in FIG. 10 and are known by those skilled in the art. The Kalman filter 806 is provided the online received pilot symbols and estimates the pilot. As shown, the Kalman filter 806 produces an estimate for both the I and Q components of the pilot signal.

Figure 11:
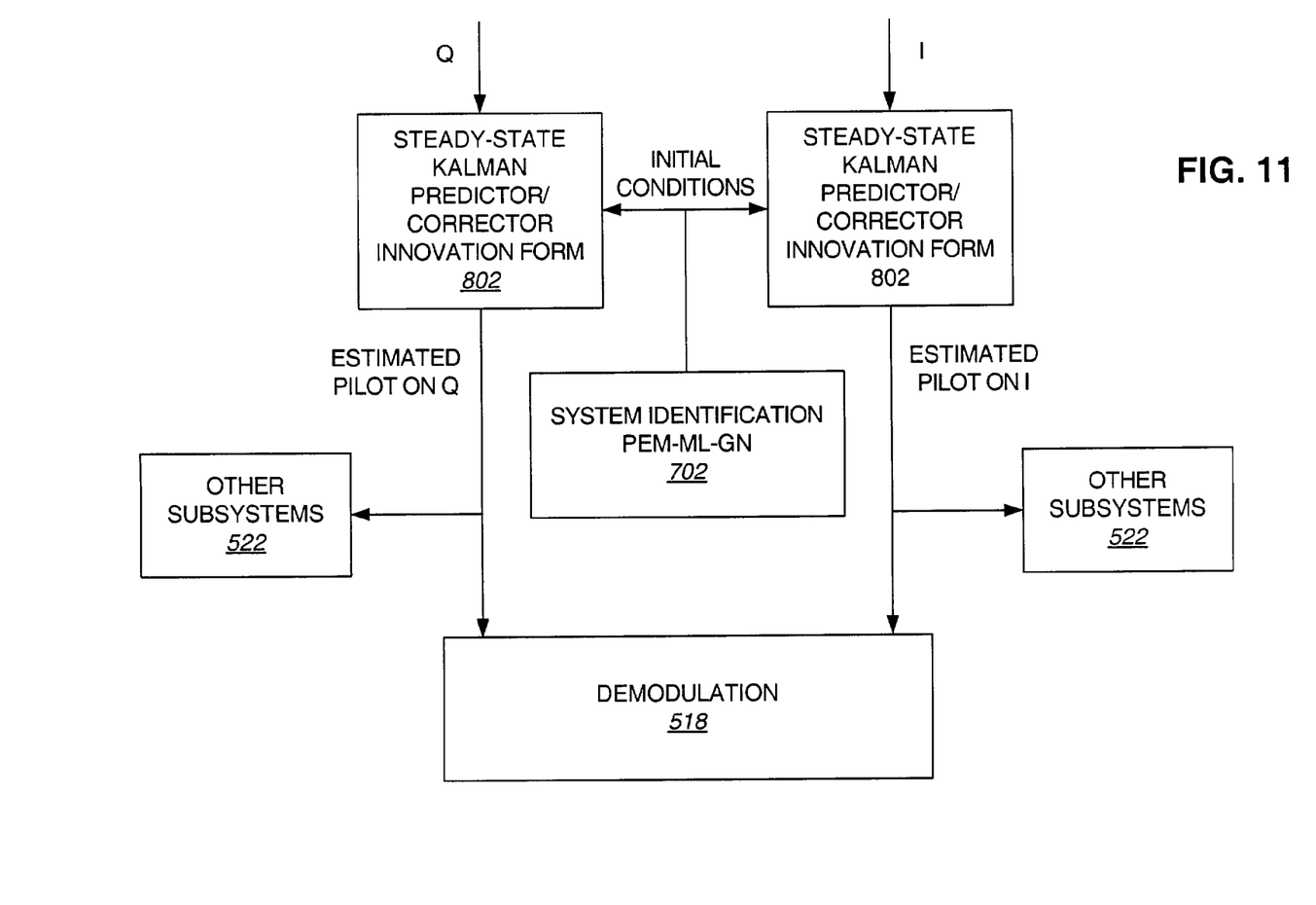
FIG. 11 is a block diagram of pilot estimation where the filtering is broken down into its I and Q components.

FIG. 11 is a block diagram of pilot estimation where the filtering is broken down into its I and Q components. The system identification component 702, using Prediction Error Method, Maximum Likelihood and Gauss Newton (PEM-ML-GN) as described above, provides the initial conditions to the steady-state Kalman Predictor/Corrector (Innovation Form) 802. As shown, the processing for the I component is similar to the processing for the Q component. The particular component is provided to the Kalman Predictor 802. The Kalman Predictor 802 generates an estimated pilot for that component. The pilot estimate is then provided to the demodulation component 518 as well as other subsystems 522.

Use of a Kalman Predictor to estimate the pilot signal may be used for many different kinds of situations. One situation where a Kalman Predictor may be useful is when a user is moving at high speeds. For example, if the user were aboard a bullet train his or her speed on the train may reach speeds of approximately 500 km/hr. Estimating the pilot signal using a Kalman Predictor in such situations may provide better results than other currently used methods.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a wireless communication system, a method for estimating an original pilot signal, the method comprising:
   receiving a CDMA signal;
   despreading the CDMA signal;
   obtaining an original pilot signal from the CDMA signal, wherein the original pilot signal contains a first quantity of noise and a first quantity of fading;
   estimating the original pilot signal using a Kalman filter and the original pilot signal to produce a pilot estimate, wherein the pilot estimate contains a second quantity of noise which is less than the first quantity of noise and a second quantity of fading which is less than the first quantity of fading, wherein the Kalman filter is determined through use of a Gauss-Newton algorithm; and
   using the pilot estimate instead of the original pilot signal to acquire the timing of one or more channels included in the CDMA signal.

2. The method as in claim 1, wherein the CDMA signal is transmitted on a downlink and wherein the downlink comprises a pilot channel.

3. The method as in claim 1, wherein the CDMA signal is transmitted on an uplink and wherein the uplink comprises a pilot channel.

4. The method as in claim 1, further comprising demodulating the pilot estimate.

5. In a wireless communication system, a method for estimating an original pilot signal, the method comprising:
   receiving a CDMA signal;
   despreading the CDMA signal;
   obtaining a pilot signal from the CDMA signal;
   configuring a Kalman filter by an offline system identification process, wherein the offline system identification process comprises:
      providing training samples; and
      calculating parameters for the Kalman filter using a prediction error method and a Gauss-Newton algorithm and generating a state estimate using the Kalman filter, wherein the calculating and generating are iteratively performed until the Kalman filter converges; and
   estimating the original pilot signal using the Kalman filter and the obtained pilot signal to produce a pilot estimate, wherein the Kalman filter is determined through use of the Gauss-Newton algorithm.

6. The method as in claim 5, wherein the parameters are calculated according to the following:

$$\Delta \hat{\theta} = \left( \frac{1}{N} \sum_{k=1}^{N} \psi_{k-1}^T \psi_{k-1} \right)^{-1} \left( \frac{1}{N} \sum_{k=1}^{N} \psi_{k-1}^T e_k \right),$$

wherein $\Delta \hat{\theta}$ is a parameter update, $\psi$ is a filtered regressor, e is an innovator, and k is an iteration sequence.

7. The method as in claim 6, wherein the prediction error method is based on an innovations representation model of the pilot signal.

8. The method as in claim 6, wherein the prediction error method finds optimum model parameters by minimizing a function of a one-step prediction error.

9. The method as in claim 8, wherein the Gauss-Newton algorithm is used in finding a numerical solution for the function.

10. The method as in claim 9, wherein the parameters are adjusted when d<1 according to the following:

$$\hat{\theta} \leftarrow \hat{\theta} + \alpha \Delta \hat{\theta}.$$

11. In a mobile station for use in a wireless communication system, a method for estimating an original pilot signal, the method comprising:
   receiving a CDMA signal;
   despreading the CDMA signal;
   obtaining an original pilot signal from the CDMA signal, wherein the original pilot signal contains a first quantity of noise and a first quantity of fading;
   estimating the original pilot signal using a Kalman filter and the original pilot signal to produce a pilot estimate, wherein the pilot estimate contains a second quantity of noise which is less than the first quantity of noise and a second quantity of fading which is less than the first quantity of fading, wherein the Kalman filter is determined through use of a Gauss-Newton algorithm; and
   using the pilot estimate instead of the original pilot signal to acquire the timing of one or more channels included in the CDMA signal.

12. The method as in claim 11, wherein the CDMA signal is transmitted on a downlink and wherein the downlink comprises a pilot channel.

13. The method as in claim 11, further comprising demodulating the pilot estimate.

14. In a mobile station for use in a wireless communication system, a method for estimating an original pilot signal, the method comprising:
   receiving a CDMA signal;
   despreading the CDMA signal;
   obtaining a pilot signal from the CDMA signal;
   configuring a Kalman filter by an offline system identification process, wherein the offline system identification process comprises:
      providing training samples; and
      calculating parameters for the Kalman filter using a prediction error method and a Gauss-Newton algorithm and generating a state estimate using the Kalman filter, wherein the calculating and generating are iteratively performed until the Kalman filter converges; and
   estimating the original pilot signal using the Kalman filter and the obtained pilot signal to produce a pilot estimate, wherein the Kalman filter is determined through use of a Gauss-Newton algorithm.

15. The method as in claim 14, wherein the parameters are calculated according to the following:

$$\Delta\hat{\theta} = \left(\frac{1}{N}\sum_{k=1}^{N}\psi_{k-1}^{T}\psi_{k-1}\right)^{-1}\left(\frac{1}{N}\sum_{k=1}^{N}\psi_{k-1}^{T}e_{k}\right),$$

wherein $\Delta\hat{\theta}$ is a parameter update, $\psi$ is a filtered regressor, e is an innovator, and k is an iteration sequence.

16. The method as in claim 15, wherein the prediction error method is based on an innovations representation model of the pilot signal.

17. The method as in claim 15, wherein the prediction error method finds optimum model parameters by minimizing a function of the one-step prediction error.

18. The method as in claim 17, wherein the Gauss-Newton algorithm is used in finding a numerical solution for the function.

19. The method as in claim 18, wherein the parameters are adjusted when ∂<1 according to the following:

$$\hat{\theta} \leftarrow \hat{\theta} + \alpha\Delta\hat{\theta}.$$

20. A mobile station for use in a wireless communication system wherein the mobile station is configured to estimate an original pilot signal, the mobile station comprising:
an antenna for receiving a CDMA signal;
a receiver in electronic communication with the antenna;
a front-end processing and despreading component in electronic communication with the receiver for despreading the CDMA signal and obtaining an original pilot signal from the CDMA signal, wherein the original pilot signal contains a first quantity of noise and a first quantity of fading;
a pilot estimation component in electronic communication with the front-end processing and despreading component for estimating the original pilot signal using a Kalman filter and the original pilot signal to produce a pilot estimate, the pilot estimate contains a second quantity of noise which is less than the first quantity of noise and a second quantity of fading which is less than the first quantity of fading, the pilot estimate is used instead of the original pilot signal to acquire the timing of one or more channels included in the CDMA signal, wherein the Kalman filter is determined through use of a Gauss-Newton algorithm; and
a demodulation component in electronic communication with the pilot estimation component and the front-end processing and despreading component for providing demodulated data symbols to the mobile station.

21. The mobile station as in claim 20, wherein the receiver receives the CDMA signal transmitted on a downlink and wherein the downlink comprises a pilot channel.

22. A mobile station for use in a wireless communication system wherein the mobile station is configured to estimate an original pilot signal, the mobile station comprising:
an antenna for receiving a CDMA signal;
a receiver in electronic communication with the antenna;
a front-end processing and despreading component in electronic communication with the receiver for despreading the CDMA signal and obtaining a pilot signal from the CDMA signal;
a Kalman filter configured by an offline system identification process, wherein the offline system identification process comprises:
providing training samples; and
calculating parameters for the Kalman filter using a prediction error method and the Gauss-Newton algorithm and generating a state estimate using the Kalman filter, wherein the calculating and generating are iteratively performed until the Kalman filter converges;
a pilot estimation component in electronic communication with the front-end processing and despreading component for estimating the original pilot signal using the Kalman filter and the obtained pilot signal to produce a pilot estimate, wherein the Kalman filter is determined through use of a Gauss-Newton algorithm; and
a demodulation component in electronic communication with the pilot estimation component and the front-end processing and despreading component for providing demodulated data symbols to the mobile station.

23. The mobile station as in claim 22, wherein the parameters are calculated according to the following:

$$\Delta\hat{\theta} = \left(\frac{1}{N}\sum_{k=1}^{N}\psi_{k-1}^{T}\psi_{k-1}\right)^{-1}\left(\frac{1}{N}\sum_{k=1}^{N}\psi_{k-1}^{T}e_{k}\right),$$

wherein $\Delta\hat{\theta}$ is a parameter update, $\psi$ is a filtered regressor, e is an innovator, and k is an iteration sequence.

24. The mobile station as in claim 23, wherein the prediction error method is based on an innovations representation model of the pilot signal.

25. The mobile station as in claim 23, wherein the prediction error method finds optimum model parameters by minimizing a function of the one-step prediction error.

26. The mobile station as in claim 25, wherein the Gauss-Newton algorithm is used in finding a numerical solution for the function.

27. The method as in claim 26, wherein the parameters are adjusted when ∂<1 according to the following:

$$\hat{\theta} \leftarrow \hat{\theta} + \alpha\Delta\hat{\theta}.$$

28. A method for offline system identification to configure a Kalman filter for real-time use in a wireless communication system to estimate a pilot signal, the method comprising:
providing training samples;
initializing parameters; and
until the Kalman filter converges, iteratively performing the following steps:
calculating new parameters using a prediction error method and a Gauss-Newton algorithm; and
generating a new state estimate using the Kalman filter; and
using the converged parameters to produce an estimate of an original pilot signal, wherein the original pilot signal contains a first quantity of noise and a first quantity of fading and the estimate of the original pilot signal contains a second quantity of noise which is less than the first quantity of noise and a second quantity of fading which is less than the first quantity of fading.

29. A method for offline system identification to configure a Kalman filter for real-time use in a wireless communication system to estimate a pilot signal, the method comprising:
providing training samples;
initializing parameters; and until the Kalman filter converges, iteratively performing the following steps:
  calculating new parameters using a prediction error method and a Gauss-Newton algorithm, wherein the parameters are calculated according to the following:

$$\Delta \hat{\theta} = \left(\frac{1}{N}\sum_{k=1}^{N} \psi_{k-1}^T \psi_{k-1}\right)^{-1} \left(\frac{1}{N}\sum_{k=1}^{N} \psi_{k-1}^T e_k\right),$$

wherein $\Delta \hat{\theta}$ is a parameter update, $\psi$ is a filtered regressor, e is an innovator, and k is an iteration sequence; and
generating a new state estimate using the Kalman filter.

30. The method as in claim 29, wherein the prediction error method is based on an innovations representation model of the pilot signal.

31. The method as in claim 29, wherein the prediction error method finds optimum model parameters by minimizing a function of a one-step prediction error.

32. The method as in claim 31, wherein the Gauss-Newton algorithm is used in finding a numerical solution for the function.

33. The method as in claim 32, wherein the parameters are adjusted when $\hat{d}<1$ according to the following:

$$\hat{\theta} \leftarrow \hat{\theta} + \alpha \Delta \hat{\theta}.$$

34. A mobile station for use in a wireless communication system wherein the mobile station is configured to estimate an original pilot signal, the mobile station comprising:
  means for receiving a CDMA signal;
  means for despreading the CDMA signal;
  means for obtaining an original pilot signal from the CDMA signal, wherein the original pilot signal contains a first quantity of noise and a first quantity of fading;
  means for estimating the original pilot signal using a Kalman filter and the original pilot signal to produce a pilot estimate, wherein the pilot estimate contains a second quantity of noise which is less than the first quantity of noise and a second quantity of fading which is less than the first quantity of fading, wherein the Kalman filter is determined through use of a Gauss-Newton algorithm; and
  means for using the pilot estimate instead of the original pilot signal to acquire the timing of one or more channels included in the CDMA signal.

35. The mobile station as in claim 34, wherein the CDMA signal is transmitted on a downlink and wherein the downlink comprises a pilot channel.

36. The mobile station as in claim 34, further comprising means for demodulating the pilot estimate.

37. A mobile station for use in a wireless communication system wherein the mobile station is configured to estimate an original pilot signal, the mobile station comprising:
  means for receiving a CDMA signal;
  means for despreading the CDMA signal;
  means for obtaining a pilot signal from the CDMA signal;
  means for configuring a Kalman filter by an offline system identification process, wherein the offline system identification process comprises:
    providing training samples; and
    calculating parameters for the Kalman filter using a prediction error method and a Gauss-Newton algorithm and generating a state estimate using the Kalman filter, wherein the calculating and generating are iteratively performed until the Kalman filter converges; and
  means for estimating the original pilot signal using the Kalman filter and the obtained pilot signal to produce a pilot estimate, wherein the Kalman filter is determined through use of a Gauss-Newton algorithm.

38. The mobile station as in claim 37, wherein the parameters are calculated according to the following:

$$\Delta \hat{\theta} = \left(\frac{1}{N}\sum_{k=1}^{N} \psi_{k-1}^T \psi_{k-1}\right)^{-1} \left(\frac{1}{N}\sum_{k=1}^{N} \psi_{k-1}^T e_k\right),$$

wherein $\Delta \hat{\theta}$ is a parameter update, $\psi$ is a filtered regressor, e is an innovator, and k is an iteration sequence.

39. The mobile station as in claim 38, wherein the prediction error method is based on an innovations representation model of the pilot signal.

40. The mobile station as in claim 39, wherein the prediction error method finds optimum model parameters by minimizing a function of the one-step prediction error.

41. The mobile station as in claim 40, wherein the Gauss-Newton algorithm is used in finding a numerical solution for the function.

42. The method as in claim 41, wherein the parameters are adjusted when $\hat{d}<1$ according to the following:

$$\hat{\theta} \leftarrow \hat{\theta} + \alpha \Delta \hat{\theta}.$$

* * * * *